P. BAMMER.
ADJUSTABLE GRIP FOR HEEL CUTTING APPARATUS.
APPLICATION FILED JAN. 2, 1917.

1,249,884.

Patented Dec. 11, 1917.

INVENTOR
Pius Bammer
by Hazard & Miller
ATTYS.

UNITED STATES PATENT OFFICE.

PIUS BAMMER, OF LOS ANGELES, CALIFORNIA.

ADJUSTABLE GRIP FOR HEEL-CUTTING APPARATUS.

1,249,884.   Specification of Letters Patent.   Patented Dec. 11, 1917.

Application filed January 2, 1917. Serial No. 140,279.

*To all whom it may concern:*

Be it known that I, PIUS BAMMER, a subject of the Emperor of Germany, residing at Los Angeles, in the county of Los Angeles and State of California, have invented new and useful Improvements in Adjustable Grips for Heel-Cutting Apparatus, of which the following is a specification.

This invention relates to a heel cutting apparatus and particularly pertains to adjustable shoe grips therefor.

It is common practice in the repair of shoes to remove a portion of the worn heel prior to building it up to its original height with new leather. This has been done in many ways, but the preferred method seems to be to square the heel up by cutting away the worn portion with a band or circular saw and then rebuilding to a desired height. It has been difficult to properly hold the shoe during the cutting operation and it is the principal object of this invention to provide a vise or clamping mechanism which will rigidly hold the shoe.

Another object of this invention is to provide a clamping mechanism within which a shoe may be instantly fastened and thereafter adjusted so that the cut made by the saw will properly square the heel.

Another object of this invention is to provide means for laterally adjusting the heel in relation to the cutting member so that a pair of shoes may be provided with heels of the same height.

Another object of this invention is to provide easily operated means for feeding the shoe into the cutting member.

It is a further object of this invention to provide shoe clamping means which may be easily operated and which will positively grip a shoe during the cutting operation.

Other objects will appear hereinafter.

The invention is illustrated, by way of example, in the accompanying drawings in which.

Figure 1:
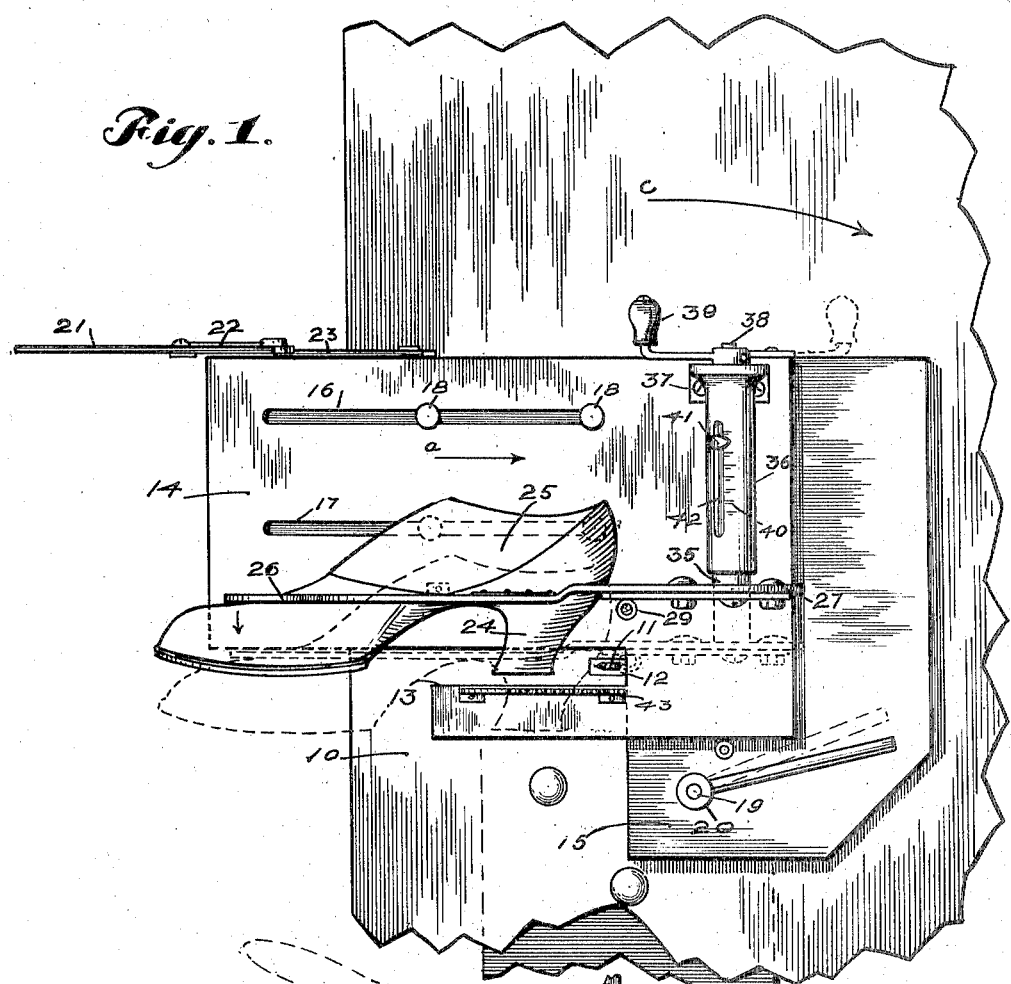
Figure 1 is a view in plan illustrating the gripping mechanism as clamping a shoe in position to be cut by the cutting member.
Figure 2:
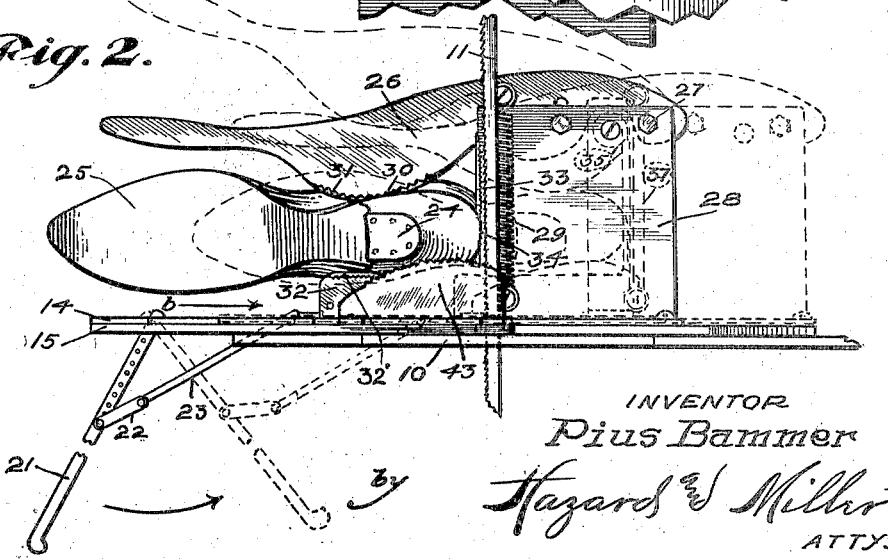
Fig. 2 is a view in side elevation illustrating the manner in which the shoe is gripped and also the means by which it is advanced against the cutting edge of the saw.

Referring more particularly to the drawings, 10 indicates the table of a cutting device, here shown as being fitted with a band saw 11. It is evident, however, that a circular saw might be used with desirable results. The table is formed with an opening 12 through which the saw moves vertically. This opening is spanned by a saw clearance slot 13 which is formed in a carriage plate 14, this plate being slidably mounted upon an adjustable base plate 15 which rests upon the table 10. The carriage plate is formed with a pair of parallel guide slots 16 and 17, through which rivet pins 18 extend to secure the plate to the base plate and to permit it to have slidable movement in the directions indicated by the arrow —*a*— in Fig. 1. The base plate is formed with a smooth surface upon which the carriage plate slides and is pivotally secured by means of a pivot pin 19 to the table 10. This pin is provided with a clamping nut 20 by which the base plate may be locked in any desired horizontally adjusted position and permits the carriage plate to be adjusted as desired in angular relation to the saw. As a means for sliding the carriage plate upon the base plate, a shifting lever 21 is fixed to the base plate and provided with links 22 and 23 which are pivoted to each other and secured at their extreme ends to the shifting lever 21 and the carriage 14. In this manner movement of the shifting lever in the direction of the arrow —*b*—, as seen in Fig. 2, will advance the carriage and permit the heel 24 of a shoe 25 to be fed into the cutting edge of the saw.

The shoe 25 is adapted to be detachably held upon the carriage plate by means of the clamping jaw 26 which is pivoted at one end by means of a bolt 27 to an upright 28. This lever is acted upon by tension spring 29 which normally tends to draw it downwardly toward the carriage and thus effect the clamping of the shoe. The lower face of the lever 26 is formed with a convex gripping jaw 30 which is composed of a series of serrations adapted to be partially embedded within the heel of the shoe. Fastened upon the lever and alongside the gripping jaw is a blade 31 having substantially the same arcuate configuration as the jaw and adapted to seat within the rand crease. Positioned directly below the jaw 30 and the blade 31 are a horizontally extending blade 32′ and a serrated jaw 32 which forms a part of the upright member 28 and is fixed thereby to the carriage plate. It will thus be seen that when the lever 26 is drawn down by the spring 29, it will effectively secure the heel of a shoe between the jaws 30 and 32 in a manner to prevent vertical or longitudinal movement of the shoe and will be further secured by blades 31 and 32' to prevent the removal of the shoe, due to its lateral movement. In order to further secure the heel in plan position a vertically extending blade 33 is fastened to the upright 28 and is adapted to slip in beneath the upper and above the top of the heel at the rear of the shoe. This movement is limited by the serrated jaw 34 which extends parallel to the blade 33 and adjacent thereto. Reference being had to Fig. 2 of the drawings it will be seen that, due to the peculiar arcuate formation of the jaw and blade 30 and 31, the heel will be secured at three points and will be gripped in a manner to prevent movement thereof. The upright 28 and the clamping lever 26 are laterally adjusted in relation to the carriage plate by the movement of a shaft 35 which is fixed at one end to the upright 28 and extends slidably and horizontally through a bearing sleeve 36. This sleeve is in turn fixed to a bracket 37 by which it is rigidly supported upon the carriage plate and in turn suitably supports the shaft. The shaft is adapted to be moved horizontally within the bearing sleeve 36 by means of an adjusting screw 38 which is threaded into the shaft and is provided with rotary motion without opportunity for longitudinal movement. In this manner movement of the hand lever 39 will cause the shaft 35 to be advanced and retracted within the sleeve as the adjusting screw is rotated.

When a heel is to be rebuilt the shoe is taken and placed with its heel between the clamping jaw 30 and the clamping jaw 32. It will be understood that the shoe will be disposed horizontally and that care will be taken to place the blades 31 and 32' in the rand crease. The shoe will then be moved backwardly until the vertical blade 33 slips into the rand crease. When the clamping lever 26 is released the spring 29 will act to positively wedge and secure the shoe against movement. The hand lever 39 may then be actuated to adjust the heel in relation to the saw in order to remove a given amount of the worn heel. This adjustment may be made uniform for both heels of a pair of shoes by reference to the graduations 40 arranged along the sleeve 36 and adapted to register with a pointer 41 secured to the shaft 35 and extending through a slot 42 in the sleeve 36. When the height of the heel has been properly determined the lock-nut 20 may be loosened so that the base and carriage plates may be swung in the direction indicated by the arrow —c— and will insure that the heel is properly alined with the saw to be squarely cut. It will be noted that when the heel is in its cutting position it will bridge the slot 13 of the carriage plate and its outer end will be supported upon an auxiliary supporting jaw 43 fixed to the carriage plate and beneath the heel. The cutting operation may then be effected by swinging the lever 21 upwardly and thereby advancing the carriage plate in relation to the saw. This will cause the heel to be cut, as will be readily understood. After the cutting operation, the clamping lever 26 may be raised and the shoe readily removed.

It will thus be seen that the shoe clamping apparatus here disclosed is simple in its construction and operation and provides means for universal adjustment of the heel in relation to a cutting member and further permits the heel to be easily fed against the cutting edge of the member without danger to the workman.

In the devices heretofore in use having only two gripping jaws it was necessary to apply so much pressure that the heel was usually loosened from the sole. I regard it as practically impossible to easily hold a heel for sawing with two points of gripping contact.

While I have shown the preferred construction of my invention as now known to me, it is evident that various changes in the combination, construction and arrangement of parts may be made by those skilled in the art without departing from the spirit of my invention.

I claim:

1. In a heel cutter, a table, a base plate adjustably mounted upon the table, a carriage plate slidably mounted upon the base plate, an upright upon the carriage plate, a saw mounted upon the table, a clamping jaw pivoted at one end to the upright, a retractile spring connecting the clamping jaw to the upright, the lower face of said clamping jaw being adapted for engaging the heel of a shoe, a blade secured to the side of the clamping jaw and adapted to engage in the rand crease, a second clamping jaw fixed to the upright member below and facing the first clamping jaw, a vertically extending blade fastened to the upright and adapted to fit in the rand crease, and a third clamping jaw secured beside the blade, said first, second, and third clamping jaws being substantially in the same plane; so that the heel of a shoe may be securely held, adjusted, and fed to the saw.

2. In a heel cutter, a table, a base plate adjustably mounted upon the table, a carriage plate slidably mounted upon the base plate, an upright upon the carriage plate, a saw mounted upon the table, a clamping jaw pivoted at one end to the upright, a retractile spring connecting the clamping jaw to the upright, the lower face of said clamping jaw being adapted for engaging the heel of a shoe, a blade secured to the side of the clamping jaw and adapted to engage in the rand crease, a second clamping jaw fixed to the upright member below and facing the first clamping jaw, a vertically extending blade fastened to the upright and adapted to fit in the rand crease, a third clamping jaw secured beside the blade, said first, second, and third clamping jaws being substantially in the same plane; so that the heel of a shoe may be securely held, adjusted, and fed to the saw; and an auxiliary supporting jaw fixed to the carriage plate upon the opposite side of the saw from the clamping jaws so as to support the portion of the heel to be cut away.

3. In a heel cutter, a table, a base plate adjustably mounted upon the table, a carriage plate slidably mounted upon the base plate, an upright slidably mounted for lateral adjustment upon the carriage plate, a shaft fixed at one end to the upright, a bearing through which the shaft slidably extends, a bracket fixed upon the carriage plate, said bearing being fixed to the bracket, and a screw for adjusting the shaft into and holding it in a desired position.

In testimony whereof I have signed my name to this specification.

PIUS BAMMER.

Copies of this patent may be obtained for five cents each, by addressing the "Commissioner of Patents, Washington, D. C."